United States Patent [19]

Nagasawa et al.

[11] Patent Number: 5,111,283

[45] Date of Patent: May 5, 1992

[54] ELECTRONIC CAMERA WITH DIGITAL SIGNAL PROCESSING CIRCUIT

[75] Inventors: Kenichi Nagasawa; Hideaki Kawamura, both of Kawasaki, Japan

[73] Assignee: Canon Kabushiki Kaisha, Tokyo, Japan

[21] Appl. No.: 481,180

[22] Filed: Feb. 20, 1990

[30] Foreign Application Priority Data

Feb. 20, 1989 [JP] Japan ................................ 1-41358

[51] Int. Cl.[5] ........................ H04N 9/04; H04N 5/225
[52] U.S. Cl. ...................................... 358/41; 358/909; 358/209
[58] Field of Search ............... 358/209, 41, 43, 47, 358/50, 909, 906, 13, 13 C, 133, 335

[56] References Cited

U.S. PATENT DOCUMENTS

| | | | |
|---|---|---|---|
| 4,652,903 | 3/1987 | Lucas | 358/11 |
| 4,652,909 | 3/1987 | Glenn | 358/41 |
| 4,758,883 | 7/1988 | Kawahara et al. | 358/44 |
| 4,823,186 | 4/1989 | Muramatsu | 358/43 |
| 4,866,510 | 9/1989 | Goodfellow et al. | 358/13 |

Primary Examiner—James J. Groody
Assistant Examiner—Safet Metjahic
Attorney, Agent, or Firm—Fitzpatrick, Cella, Harper & Scinto

[57] ABSTRACT

An electronic camera for storing in a storage medium digital data corresponding to an object image. The camera is arranged to image an object, to form a plurality of categories of digital data respectively corresponding to the object, to successively output the categories of digital data formed, to encode at least two of the categories of digital data successively output, and to store the encoded digital data in the storage medium. The electronic camera is thus designed to be reduced in size, weight and cost, and to store a large amount of digital data in the storage medium.

14 Claims, 4 Drawing Sheets

ELECTRONIC CAMERA WITH DIGITAL SIGNAL PROCESSING CIRCUIT

BACKGROUND OF THE INVENTION

1. Field of the Invention

This invention relates to an electronic camera which stores, in storage medium, digital data corresponding to an object image.

2. Description of the Prior Art

Recently, with the rapid development of semiconductor technology, small semiconductor memories having large capacities are available at comparatively low costs. Also, in the field of video equipment for home and personal use, video tape recorders (VTR) having a memory capable of storing color TV signals for one frame (hereinafter referred to as "frame memory") have been developed as manufactured articles. A type of electronic still video camera has also been made public which has a detachable memory pack incorporating a memory capable of storing color image signals for several tens of frames, and in which color video signals for one field or one frame corresponding to a still image taken by the camera are stored in the memory of the memory pack.

To increase the number of frames stored in this kind of electronic camera without increasing the size of the memory pack, it is necessary to reduce the number of data items for one frame. If the number of data items is reduced simply by reducing the number of samples, the image quality is deteriorated. It is therefore desirable to reduce the number of data items by high efficiency encoding techniques well known in the field of digital signal processing.

In a case where color video signals are digitized, however, the data rate is extremely high. For example, in a case where a frame having 500×700 pixels is digitized and where a luminance signal and two color difference signals are sampled respectively by 8 bits, the total number of data items is (500×700×3×8=) 8.4 Mbits. If this large amount of data is transmitted within 1/30 sec. according to the frame frequency, the data rate is 252 Mbps and thus extremely high.

It is not possible to design an encoding circuit for high efficiency encoding of a data sequence of such a large data rate even if high speed circuit elements are utilized. Ordinarily, for such encoding, a plurality of encoding circuits are used to effect parallel processing to reduce the necessary processing speed of each encoding circuit.

For encoding based on parallel processing, a plurality of high efficiency encoding circuits must be provided for processing each of the two color difference signals, and the scale of hardware is thereby increased. Also, circuit elements having maximized processing speeds are required for the encoding circuits. Under these conditions, it is difficult to reduce the total cost of the camera.

SUMMARY OF THE INVENTION

An object of the present invention is to provide an electronic camera free from the above-described problems.

Another object of the present invention is to reduce the size and the weight of an electronic camera.

The present invention therefore provides an electronic camera for storing digital data corresponding to an object image in a storage medium, comprising: a digital data forming means for imaging an object and forming a plurality of categories of digital data respectively corresponding to the object image; an output means supplied with the plurality of categories of digital data formed by the digital data forming means and successively outputting the categories of digital data supplied; an encoding means for encoding at least two of the plurality of categories of digital data successively output from the output means and for outputting the encoded data; and a storage means for storing the digital data output from the encoding means in the storage medium.

Another object of the present invention is to provide an electronic camera in which the size and the weight of an image signal output device are reduced.

The present invention therefore provides an image signal output device for reading out data stored in a storage medium which data includes a plurality of different categories of image data and which is encoded in a high efficiency encoding manner, and for forming and outputting image signals corresponding to the encoded data read out, the image signal output device including: a data decoding means for reading out the encoded data stored in the storage medium and decoding the read out encoded data in a high efficiency decoding manner to successively output the plurality of different categories of image data; an output means for simultaneously outputting the plurality of categories of image data successively output from the data decoding means; and an image signal forming means for forming image signals by using the plurality of categories of image data simultaneously output from the output means.

A further object of the present invention is to provide an electronic camera capable of storing a large amount of digital data in a storage medium.

The present invention therefore provides an electronic camera for storing digital data corresponding to an object image in a storage medium, comprising: an information data forming means for imaging an object and forming luminance information data and color information data respectively corresponding to the object image; a data output means supplied with the luminance information data and the color information data formed by the information data forming means and successively outputting at a predetermined data rate the luminance information data and color information data supplied; a high efficiency encoding means for encoding in a high efficiency encoding manner the luminance information data and the color information data successively output from the output means at the predetermined data rate and for outputting the encoded data; and a storage means for storing in the storage medium the data encoded in the high efficiency encoding manner and output from the high efficiency encoding means.

Other objects and features of the present invention will become apparent upon reading the following detailed description of an embodiment of the present invention taken in conjunction with the accompanying drawings.

DESCRIPTION OF THE PREFERRED EMBODIMENT

An embodiment of the present invention will be described below.

Figure 1:
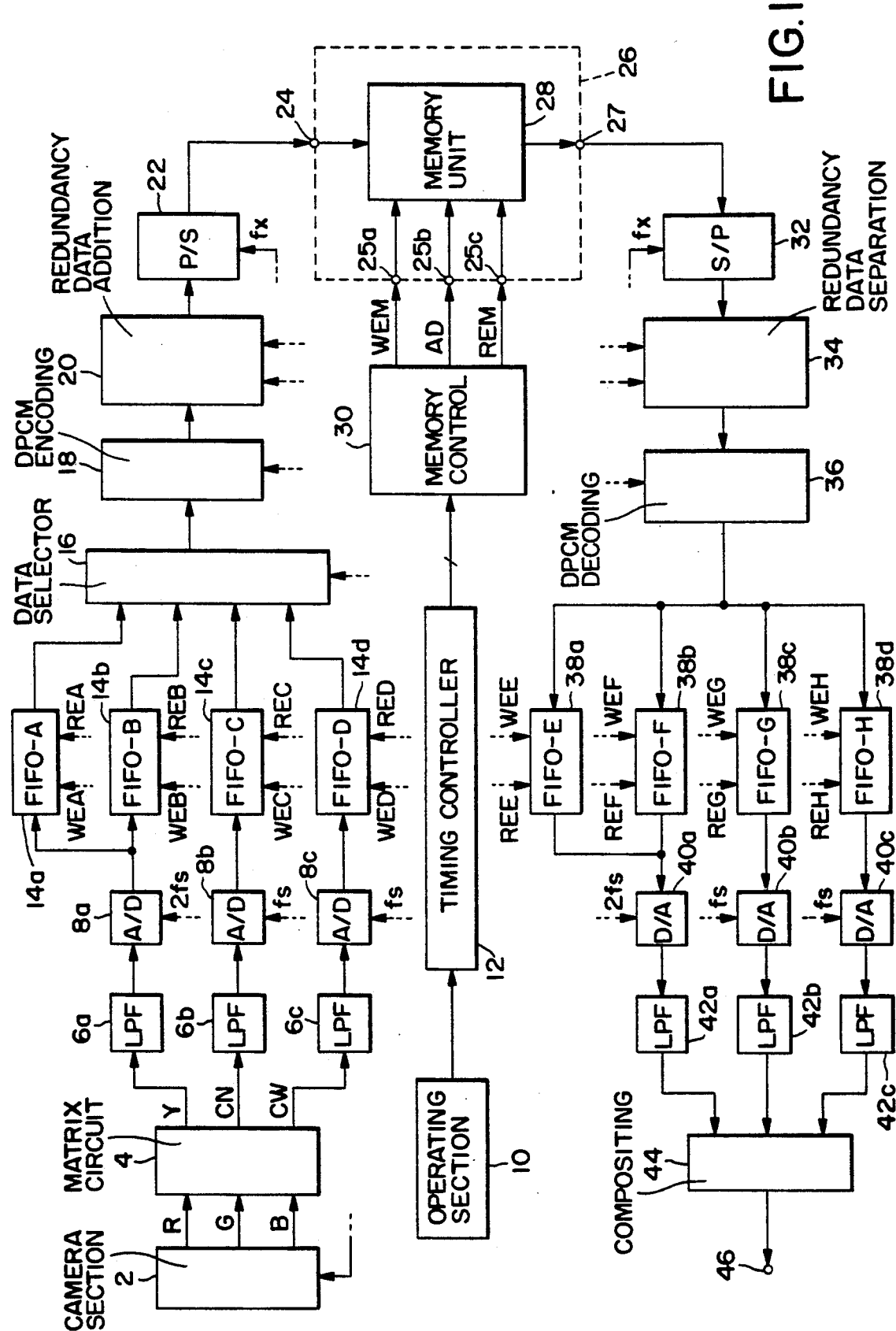
FIG. 1 is a block diagram of the construction of an electronic camera which represents an embodiment of the present invention.

FIG. 1 shows the construction of an electronic camera which represents an embodiment of the present invention. The electronic camera has a camera section 2 having an imaging means, a matrix circuit 4 for converting R, G, B signals from the camera section 2 into a luminance signal Y and color difference signals $C_N$ and $C_W$, low-pass filters (LPFs) 6a, 6b, and 6c for preventing interference between each of the signals Y, $C_N$, and $C_W$ and a return component produced at a subsequent sampling stage, and A/D converters 8a, 8b, and 8c for digitizing the signals Y, $C_N$, and $C_W$ at respectively. sampling frequencies $2f_s$, $f_s$, and $f_s$, respectively.

Figure 2:
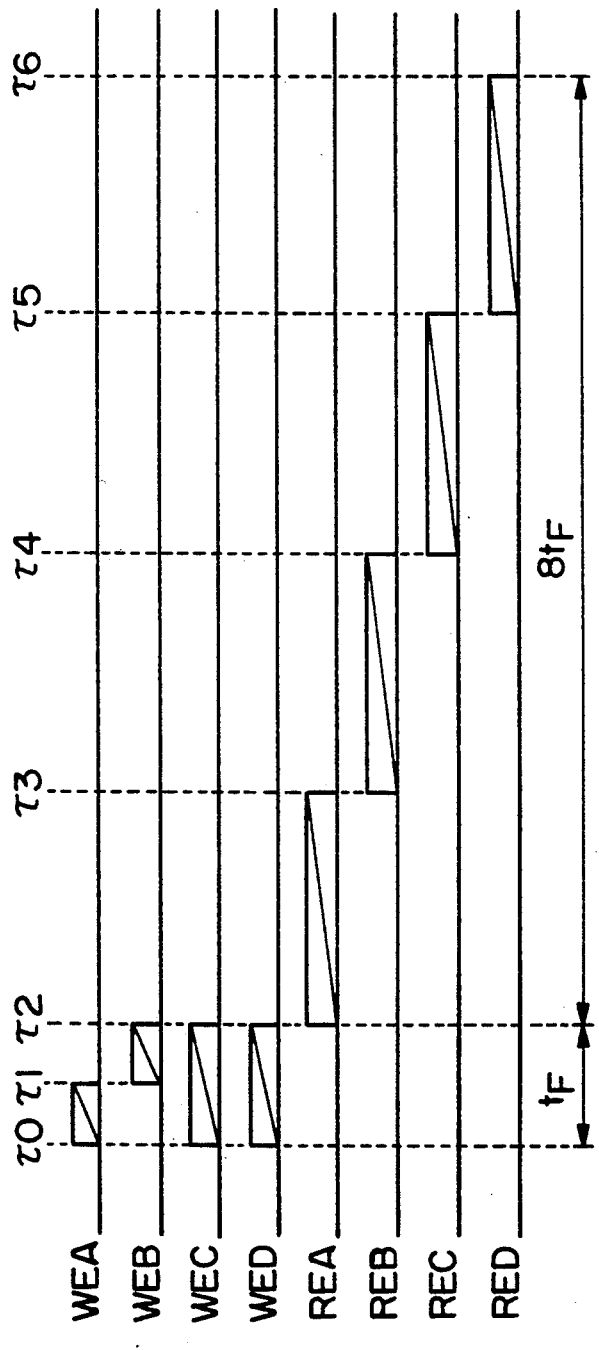
FIG. 2 is a timing chart of the data storing operation of the electronic camera of FIG. 1.

FIG. 2 is a timing chart of the data storing (picture-taking) operation of the electronic camera shown in FIG. 1. The data storing operation of this embodiment will be described below with reference to FIG. 2.

When a picture-taking command is issued from an operating section 10 by, for example, the operation of the shutter, a timing controller 12 drives the camera section 2, the A/D converters 8a, 8b, and 8c. The A/D converters 8a, 8b, and 8c thereby output a digital luminance signal at a data rate $2f_s$ and digital color difference signals at a data rate $f_s$. The luminance signal and the color difference signals for one frame are thereby output from the A/D converters 8a, 8b, and 8c every one-frame period $t_F$ of a TV signal, and are written in first-in first-out (FIFO) memories 14a, 14b, 14c, and 14d from the predetermined time $\tau 0$ of the shutter operation. The time $\tau 0$ is set to the first frame starting time at which the camera section 2 can operate stably after the operation of the shutter.

The digital color difference signals $C_N$ and $C_W$ from the A/D converters 8b and 8c are written in the FIFO-C 14c and the FIFO-D 14d for one-frame period from $\tau 0$ to $t_F$. The timing controller 12 produces a write clock at a frequency $f_S$ for the FIFO-C and the FIFO-D and supplies write enable clocks WEC and WED to the FIFO-C and the FIFO-D for the period of time from $\tau 0$ to $t_F$, as shown in FIG. 2.

On the other hand, the digital luminance signal Y from the A/D converter 8a is written in the FIFO-A 14a for the period of time from $\tau 0$ to $\frac{1}{2} t_F$ (until the time $\tau_1$ in FIG. 2 is reached) with the write clock WEA of the frequency $2f_s$, and is written in the FIFO-B 14b for a period of time from $\tau 1$ to $\frac{1}{2} t_F$ (until the time $\tau 2$ in FIG. 2 is reached) with the write clock WEB of the frequency $2f_s$. Thus, the FIFO memories (the number of which are proportional to the sampling frequency) are provided for the signals Y, $C_N$, and $C_W$. It is thereby possible to use FIFO memories having equal capacities, which is suitable for mass production.

After the color video signals corresponding to one frame have been written in the FIFO-A to D, signals are successively read out of the FIFO memories. In this example, reading is started from the FIFO-A. The frequency of the read clock is set to a frequency low enough to avoid adverse influence upon the processing in the subsequent step. In this embodiment, the read clock frequency is set to $f_s/2$. Accordingly, the period of time for reading from each FIFO memory is $2t_F$. That is, as shown in FIG. 2, the FIFO-A is read for the period of time from $\tau 2$ to $\tau 3$, the FIFO-B is read from $\tau 3$ to $\tau 4$, the FIFO-C is read from $\tau 4$ to $\tau 5$, and the FIFO-D is read from $\tau 5$ to $\tau 6$. Data thereby read out is supplied to a data selector 16 for a period of time $8t_F$.

The data selector 16 is controlled by the timing controller 12 to successively output every one-frame period the data read out of the FIFO memories. The rate at which the data is thereby output is $\frac{1}{8}$ of that in the case where the whole of the data to be output from the data selector is output in the one-frame period.

The data output from the data selector 16 is supplied to the DPCM encoder 18 to undergo a well-known kind of processing such as differential, non-linear quantization, thereby outputting DPCM codes. Basically, the DPCM encoder 18 can be adapted to process both the luminance signal and the color difference signals. In this embodiment, however, the DPCM encoder 18 is constructed as shown in FIG. 3 in consideration of the difference between sampling frequencies for the luminance signal and the color difference signal.

Figure 3:
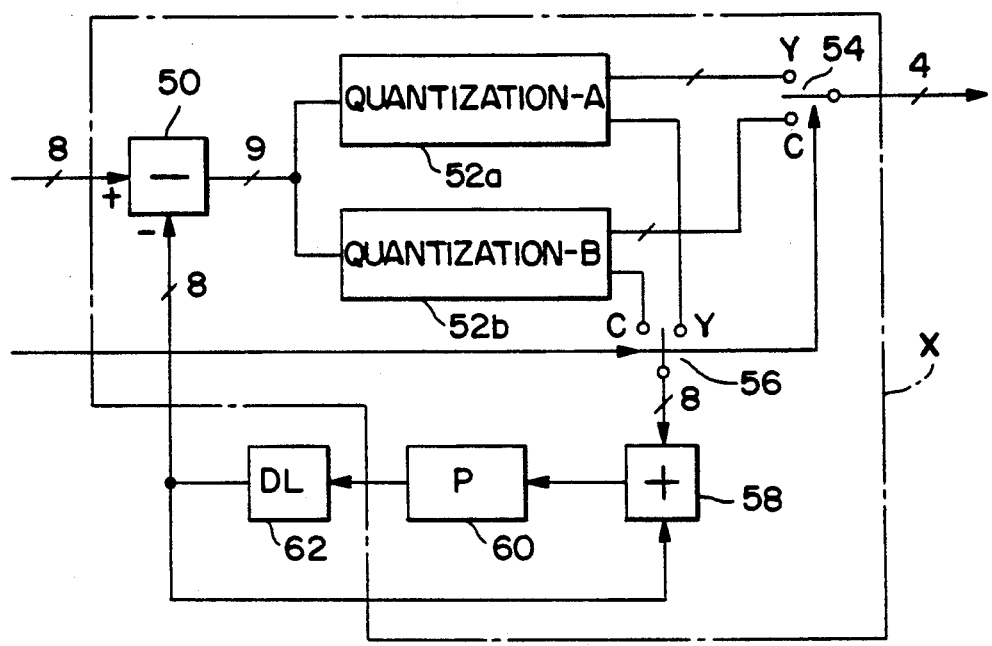
FIG. 3 is a diagram of the construction of the encoder of the electronic camera shown in FIG. 1.

A subtracter 50 shown in FIG. 3 calculates the difference between a sampled value and a predictor. Difference values output from the subtracter 50 are supplied to a luminance signal quantizer-A 52a and a color difference signal quantizer-B 52b to be quantized in a non-linear quantization manner. A code quantized by each quantizer is supplied to a data selector 54 controlled by the timing controller 12; the code output from the quantizer A is output as a DPCM code for the period of time from $\tau 2$ to $\tau 4$ shown in FIG. 2, while the code output from the quantizer B is output as a DPCM code for the period of time from $\tau 4$ to $\tau 6$. The quantizers 52a and 52b supply, along with these quantized codes, representative values obtained by inverse quantization of the quantized codes to a data selector 56. The data selector 56 is changed over in sychronization with the changeover of the data selector 54 to output the representative quantized value corresponding to the output DPCM code. This representative quantized value is added to the predictor by an adder 58, thereby obtaining a local decoded value. The local decoded value is multiplied by a prediction coefficient P by a multiplier 60, is delayed by a delay device 62, and thereafter serves as the next predictor.

The thus-constructed DPCM encoder can be designed to have quantization characteristics suitable for the luminance signal and the color difference signal and to enable a greater part of the circuit to be used in common for these signals. If the components in the area indicated by the chain line x in FIG. 3 are constituted by one read only memory (ROM), the ROM may be of a 17 bit address input type for 8 bits of the sampled value, 8 bits of the predictor and 1 bit from the timing controller.

The DPCM codes processed by data compression in the DPCM encoder 18 are supplied to a redundancy data addition circuit 20, and error correction codes (ECC) or the like are thereby added to the DPCM codes. Thereafter, the DPCM codes are changed into serial data by a parallel-serial (P/S) converter 22, and the converted data is supplied to an output terminal 24 of the camera body. A memory control circuit 30 supplies a memory section 26 through a terminal 25a with a write clock (WEM) for writing in a memory unit 28 for the period of time from $\tau 2$ to $\tau 6$ shown in FIG.

2. The circuit 30 also supplies the memory section through a terminal 25b with address data indicating the operation of the operating section 10 or the address designated by the controller 12.

The memory 26 is detachably attached to the camera body and stores the color video signals for one frame in the designated address each time the shutter of the operating section 10 is operated.

Next, the read operation of the embodiment will be described below. After the address with which the memory is to be read has been designated through the operating section 10, a read command is issued. The memory control circuit 30 thereby outputs data AD indicating the designated address and a read clock (REM) for reading the memory unit 28 to read video signals for one frame out of the memory unit 28 for a period of time $8t_F$ in the same order as the write order.

The data thereby read out is converted into parallel data by a serial-parallel (S/P) converter 32, undergoes error correction in a redundancy separation circuit 34, and is thereafter supplied to a DPCM decoder 36. The DPCM decoder 36 has a construction corresponding to that of the DPCM encoder 18, i.e., a construction such as that shown in FIG. 4 if the encoder 18 has the construction of FIG. 3.

Figure 4:
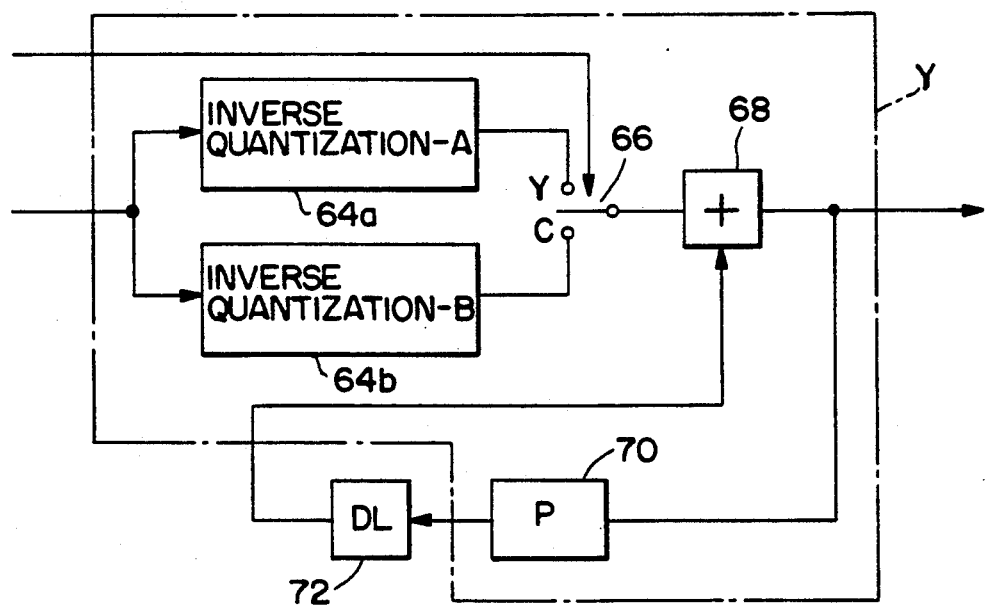
FIG. 4 is a diagram of the construction of the decoder of the electronic camera shown in FIG. 1.

An inverse quantizer-A 64a and an inverse quantizer-B 64b shown in FIG. 4 have the same inverse quantization characteristics of the inverse quantization characteristics of the quantizer-A 52a and the quantizer-B 52b of FIG. 3. A data selector 66 outputs data which is the output from the inverse quantizer-A when the DPCM code of the luminance signal is read out of the memory unit 28, and outputs data which is the output from the inverse quantizer-B when the DPCM code of each color difference signal is read out. Each of the difference codes output from the data selector 66 in this manner is decoded by an adder 68 and is output as a decoded value. The decoded value is multiplied by the prediction coefficient P by a multiplier 70, is delayed by a delay circuit 72 and is supplied to the adder 68 as a predictor.

Figure 5:
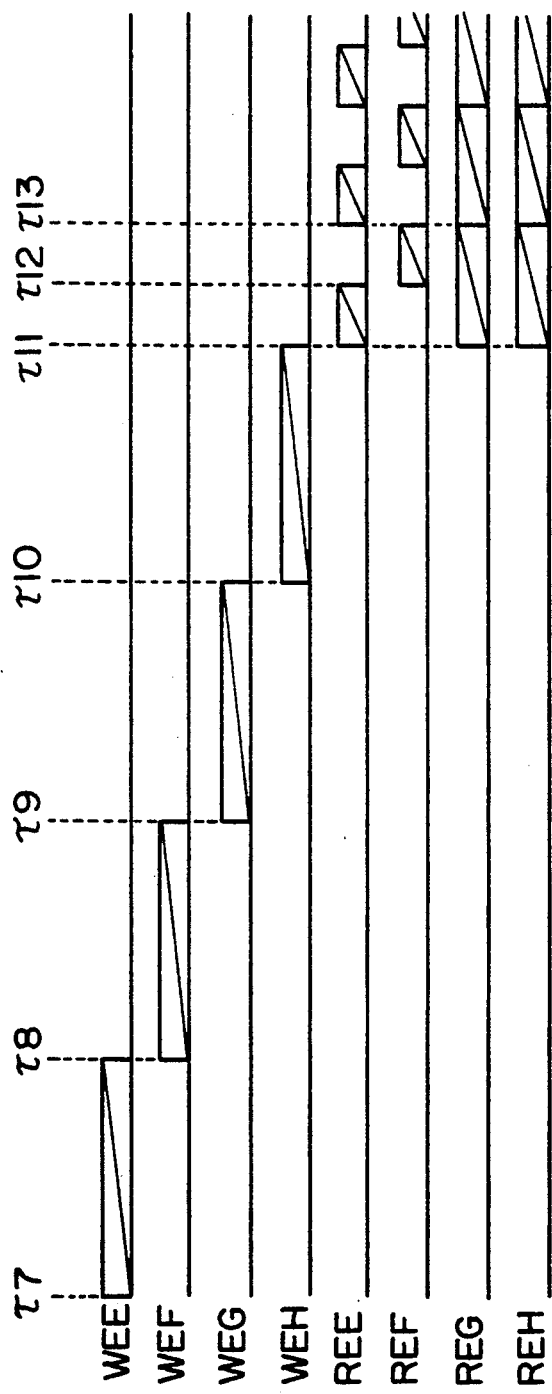
FIG. 5 is a timing chart of the data reading operation of the electronic camera shown in FIG. 1.

Digital signals decoded by the DPCM decoder 36 are supplied to FIFO-E to H 38a to 38d, respectively. As shown in FIG. 5 which is a timing chart of the data reading operation of the electronic camera shown in FIG. 1, digital signals decoded by the DPCM decoder 36 are successively written in the FIFO-E to H with clocks WEE to WEH having a frequency $\frac{1}{2}$ $f_s$. This writing is completed in the period of time of $8t_F$ (at the time $\tau 11$ shown in FIG. 5). Thereafter, each of the FIFO-E and the FIFO-F is read. The frequency of read clocks REE and REF for reading the FIFO-E and the FIFO-F is $2f_s$, and the frequency of read clocks REG and REH for reading the FIFO-G and the FIFO-H is $f_s$. The FIFO-E and the FIFO-F are alternately read with respect to $\frac{1}{2}$ frames while the FIFO-G and the FIFO-H are repeatedly read for every frame.

A digital-analog (D/A) converter 40a is thereby supplied with the data luminance signal Y for one frame repeatedly every one-frame period after the time $\tau 11$, while D/A converters 40b and 40c are supplied with the color difference signals $C_N$ and $C_W$ for one frame every one-frame period. Return components of outputs from the D/A converters 40a, 40b, and 40c are removed by LPFs 42a, 42b, and 42c, and these outputs are thereafter combined by a compositing circuit 44 to form a composite TV signal which is output through an output terminal 46 as a still image signal.

In the thus-constructed electronic camera, the signals input into the DPCM encoder 18 are supplied at a rate $\frac{1}{8}$ of the original data rate. There is therefore no need for high speed circuit elements or a parallel processing arrangement for the construction of the DPCM encoder, and the overall size and weight of the camera can therefore be reduced. It is also possible to realize DPCM encoder processing of a higher order and a high quality, as well as to minimize the extent of deterioration in the image qualities due to data range compression. Further, it is possible to effect encoding by using the same circuits for the luminance signal and the color difference signals and to thereby reduce the circuit scale. By these effects, the data to be stored can be sufficiently compressed, and many still images can be stored in a small memory.

In the above-described electronic camera, both the color difference signals and the luminance signal are time-base-expanded, but it is possible to time-base-expand the luminance signal alone because the sampling frequency of the luminance signal is ordinarily high. For example, even if in the above-described embodiment the FIFI-C and FIFO-D are removed while the frequency of the read clock for the FIFO-A and the FIFO-B is set to $f_s$, the rate at which the data is supplied from the data selector 16 is $\frac{1}{4}$ of the original rate. The effects of this arrangement are similar to those described above.

What is claimed is:

1. An electronic camera for storing in a storage medium digital data corresponding to an object image, said camera comprising:
   (A) digital data forming means for imaging an object and forming a plurality of categories of digital data corresponding to the object image;
   (B) a plurality of memories respectively supplied with the plurality of categories of digital data formed by said digital data forming means, said memories successively storing the plurality of categories of data supplied;
   (C) data selection/output means for successively selecting and outputting the categories of digital data stored in said plurality of memories;
   (D) one encoding means for encoding the plurality of categories of digital data successively output from said selection/output means and for outputting the encoded data; and
   (E) storage means for storing the digital data output from said encoding means in the storage medium.

2. An electronic camera according to claim 1, wherein said digital data forming means is arranged to image the object, to form a category of luminance information data and a category of color information data corresponding to the object and to output these categories of data.

3. An electronic camera according to claim 1, wherein said encoding means is arranged to encode the plurality of categories of digital data successively output from said selection/output means and to output the encoded data.

4. An electronic camera according to claim 1, wherein said storage means includes:
   (A) a storage medium for storing the digital data output from said encoding means, said storage medium being detachably mounted on the main body of the electronic camera; and (B) storing operation control means for controlling the operation of storing the digital data output from said encoding means in said storage medium.

5. An electronic camera for storing in a storage medium digital data corresponding to an object image, said camera comprising:
 (A) information data forming means for imaging an object, forming luminance information data and color information data respectively corresponding to the object image, and successively outputting these categories of data;
 (B) a luminance information data memory for successively storing the luminance information data formed by said information data forming means and for successively outputting the stored luminance information data;
 (C) a color information data memory for successively storing the color information formed by said information data forming means and for successively outputting the stored color information data; and
 (D) data selection/output means for selectively and successively outputting the luminance information data successively output from said luminance information data memory and the color information data successively output from said color information data memory;
 (E) a single encoding means for encoding of the luminance information data and the color information data successively output from said data selection/output means, and for outputting the encoded data; and
 (F) storage means for storing in the storage medium the encoded data output from said encoding means.

6. An electronic camera according to claim 5, wherein said encoding means is arranged to encode, in a differential encoding manner, the luminance information data and the color information data successively output from said data selection/output means and to output the differentially encoded data.

7. An electronic camera according to claim 5, wherein said storage means includes:
 (A) a storage medium for storing the data encoded in and output from said encoding means, said storage medium being detachably mounted on the main body of the electronic camera; and
 (B) storing operation control means for controlling the operation of storing in said storage medium the data encoded in and output from said encoding means.

8. An image signal output device for reading out data stored in a storage medium which data includes a plurality of different categories of image data which are encoded, and for forming and outputting image signals corresponding to the encoded data read out, said image signal output device comprising:
 (A) data decoding means for reading out the encoded data stored in the storage medium and for decoding the read-out encoded data to successively output the plurality of different categories of image data;
 (B) output means for simultaneously outputting the decoded plurality of categories of image data successively output from said data decoding means; and
 (C) image signal forming means for forming image signals by using the plurality of categories of image data simultaneously output from said plurality of memories, and for outputting the formed image signals.

9. An image signal output device for reading out encoded data stored in a storage medium which data includes luminance information data and color information data, and for forming and outputting image signals corresponding to the read-out encoded data, said image signal output device comprising:
 (A) data decoding means for reading out the encoded data stored in the storage medium and for decoding the read-out encoded data to successively output the luminance information data and the color information data;
 (B) a luminance information data memory for successively storing the luminance information data output from said data decoding means, successively reading out the stored luminance information data at a first data rate, and outputting the read-out luminance information data;
 (C) a color information data memory for successively storing the color information output from said data decoding means, successively reading out the stored color information data at a rate lower than the first rate, and outputting the color information data simultaneously with the luminance information data output from said luminance information data memory; and
 (D) image signal forming means for forming image signals by using the luminance information data output from said luminance information data memory and the color information data output from said color information data memory, and for outputting the formed image signals.

10. An image signal output device according to claim 9, wherein said data decoding means is arranged to read out the encoded data stored in the storage medium, to decode the read-out encoded data in a differential decoding manner, and to successively output the decoded luminance information data and the decoded color information data.

11. An image signal output device according to claim 9, wherein said image signal forming means includes:
 first conversion means for converting the luminance information data output from said luminance information data memory into a luminance information signal and for outputting the luminance information signal;
 second conversion means for converting the color information data output from said color information data memory into a color information signal and for outputting the said color information signal; and
 composite color image signal forming means for forming a composite color image signal by using the luminance signal output from said first conversion means and the color information signal output from said second conversion means.

12. An image signal output device according to claim 9, wherein a main body of the device is arranged to detachably mount the storage medium device.

13. An image signal output device according to claim 8, wherein the plurality of categories of image data include luminance information data and color information data.

14. An image signal output device according to claim 8, wherein said device is arranged to detachably mount the storage medium.

* * * * *

UNITED STATES PATENT AND TRADEMARK OFFICE
CERTIFICATE OF CORRECTION

PATENT NO. : 5,111,283
DATED : May 5, 1992
INVENTOR(S) : KENICHI NAGASAWA, ET AL.

It is certified that error appears in the above-identified patent and that said Letters Patent is hereby corrected as shown below:

COLUMN 3

Line 31, "section 2," should read --section 2, and--.
    Line 62, "is" should read --are--.

Signed and Sealed this

Thirty-first Day of August, 1993

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,111,283

DATED : May 5, 1992

INVENTOR(S) : Kenichi Nagasawa, et al.

It is certified that error appears in the above-identified patent and that said Letters Patent is hereby corrected as shown below:

Column 3

Line 31, "Section 2," should read -- section 2, and --.
    Line 62, "is" should read --are--.

Column 6

Line 39, "said" (1st. occ.) should read --each of said--.

Line 40 claim 1, "storing" should read --storing one of--.

This Certificate supersedes Certificate of Correction issued August 31, 1993.

Signed and Sealed this

Thirtieth Day of November, 1993

Attest:

BRUCE LEHMAN

Attesting Officer      Commissioner of Patents and Trademarks